Dec. 1, 1942.  F. G. BRUECKMANN  2,303,680
CATALYST RECOVERY
Filed June 29, 1940
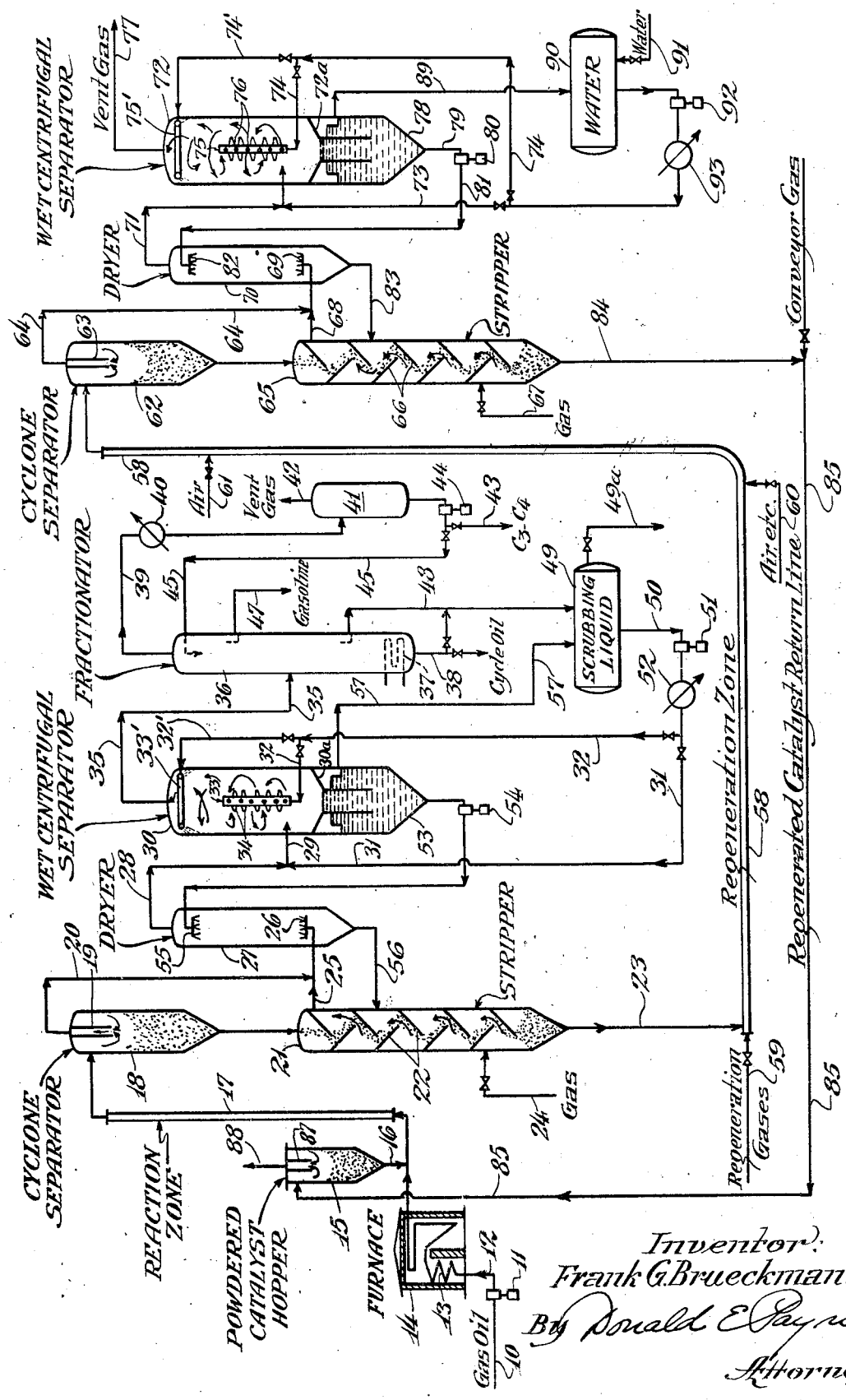
Inventor:
Frank G. Brueckmann
By Donald E. Payne
Attorney.

Patented Dec. 1, 1942

2,303,680

UNITED STATES PATENT OFFICE 2,303,680

CATALYST RECOVERY

Frank G. Brueckmann, Hammond, Ind., assignor to Standard Oil Company, Chicago, Ill., a corporation of Indiana Application June 29, 1940, Serial No. 343,108

7 Claims. (Cl. 196—52)

This invention relates to catalyst recovery and it pertains more particularly to the removal of powdered catalyst from vapor streams. While the invention is primarily directed to hydrocarbon conversion processes it is applicable to any process wherein it is desired to remove the last traces of finely divided solids in substantially dry form from a gaseous stream.

Many hydrocarbon conversion processes, such as catalytic cracking, catalytic reforming, catalytic isomerization, etc. employ powdered catalyst which is contacted with hydrocarbon vapors at high temperatures in a reaction zone, then separated from the hydrocarbon vapors, regenerated and returned to the contacting step. In such processes considerable trouble has been experienced in removing particles of catalyst from the hot hydrocarbon vapor streams and from the regeneration gases respectively. Most of the catalyst, about 95 to 99.9% can be separated from the gaseous or vapor stream by centrifugal separation in so-called cyclone separators. However, a small amount of catalyst is usually carried with gases and vapors leaving such separators. The catalyst which is thus carried with hydrocarbon reaction products may be recovered in heavy liquid products in a subsequent fractionation step. The catalyst which is not removed from regeneration gases has been for the most part entirely lost. It has been proposed to employ electrical precipitation for the recovery of catalyst from regeneration gases but this system is expensive and is objectionable for many reasons. An object of my invention is to provide new and improved method and means for recovering dry spent catalyst from the hydrocarbon reaction products and dry regenerated catalyst from the regeneration gases. In commercial systems the loss of even 0.1% of catalyst requires tons of catalyst per day to compensate for this loss.

Heretofore the powdered catalyst remaining unseparated in the hydrocarbon vapors after the cyclone separation stage has been collected with cycle stock and returned directly to the conversion step without regeneration. An object of my invention is to provide an improved method and means for permitting regeneration of this recovered catalyst before it is recycled.

A further object of the invention is to provide an improved method and means for utilizing the heat of reaction gases or regeneration gases for drying catalyst material which has been separated in a wet centrifugal separation step.

A further object is to provide an improved method and means for permitting the regeneration of catalyst removed by wet centrifugal separation along with the regeneration of catalyst removed by dry centrifugal separation.

A further object is to provide an improved method and means for removing water from an aqueous powdered catalyst slurry without causing catalyst agglomeration and for returning this catalyst from which water has been removed together with other regenerated catalyst to the conversion system.

In practicing the invention I introduce the gases from a cyclone separator into a drying zone and from the drying zone to a wet centrifugal separator which effectively removes substantially all of the powdered catalyst in the form of a wet slurry. I then inject or atomize this wet slurry into the top of the drying zone so that the slurry liquid is vaporized by the heat of the hot gases introduced into the drying zone. The powdered catalyst from the base of the drying zone is then combined with the powdered catalyst separated by dry centrifugal separation. In the separation of catalyst from reaction products I employ a gas oil scrubbing liquid which is continuously recycled within the system.

For removing catalyst from the regeneration gases I prefer to use water as a scrubbing liquid and I utilize the waste heat in the regeneration gases for completely vaporizing the water from the recovered catalyst. In this latter process the aqueous catalyst slurry is atomized or injected into the stream of hot regeneration gases so that the water is removed without any catalyst agglomeration and without the catalyst material passing through a pasty stage.

The invention will be more clearly understood from the following detailed description and from the accompanying drawing which forms a part of this specification and which diagrammatically illustrates a flow sheet of my improved process.

While the invention is applicable to any hydrocarbon conversion process which employs powdered catalyst, I will describe as a preferred embodiment the application of a powdered catalyst to a catalytic cracking process for the conversion of gas oil into high quality motor fuel. Gas oil from line 10 is introduced by pump 11 through line 12 to coils 13 of pipe still furnace 14. Powdered catalyst from hopper 15 is introduced into the vaporized gas oil stream leaving the pipe still furnace by means of a suitable injector or forced feed device (such as a Fuller-Kenyon screw pump) in line 16. The catalyst may be added to the oil stream either before or after this stream passes through the furnace coils, but preferably after the stream leaves the furnace.

The catalyst is preferably an activated hydro-silicate of alumina in finely divided form, the particle size ranging from about 200 microns to 10 microns or even less. The invention is not limited however to any particular catalyst but may be an activated clay, a metal oxide such as alumina or magnesia, deposited on silica gel, or it may be any of the well known catalyst materials. For aromatization or catalytic reforming the catalyst may be an activated alumina on which molybdenum oxide, chromium oxide or other metal oxide has been deposited. The catalyst per se forms no part of the present invention and it will not be described in further detail. Furthermore, the catalyst size is not critical in the present invention and it may vary throughout a wide range.

In the catalytic cracking process the temperature to which the gas oil products are heated usually ranges from 900 to 1050° F. and the pressures are usually from atmospheric to 50 pounds or higher per square inch. About 0.2 to 20 pounds of catalyst per pound of oil treated may be employed and the superheated vapors together with the catalyst are passed through an elongated reactor 17 to give a time of contact of about 1 to 50 seconds.

The hot reaction products with suspended catalyst material are introduced from reactor 17 into cyclone separator 18 which is provided with a cylindrical baffle 19 in the upper part thereof through which gases and vapors are withdrawn by means of line 20.

Usually about 95 to 99.9% of the powdered catalyst is withdrawn from the base of separator 18 into stripping column 21 which is provided with inclined baffles 22, the stripped catalyst leaving the stripping zone through line 23. A stripping gas which may be steam or a normally gaseous hydrocarbon obtained from the fractionation system or any other inert gas is introduced through line 24 at the base of column 21 and withdrawn through line 25 to line 20.

The hot reaction products and stripping gases from line 20 are introduced by dispersing means 26 into the base of drying tower 27 and are thence conducted by lines 28 and 29 to wet centrifugal separating tower 30. A vaporizable liquid which is preferably gas oil may be introduced by line 31 into the stream of gases entering the wet centrifugal separator. The amount of such liquid should be proportioned to cause a partial condensation of the heaviest products of the reaction in order to form a mist or fog in the gases which enter tower 30 through line 29. These gases are tangentially introduced into the wet centrifugal separator at such velocity as to effect a rapid swirling motion.

In the center of the wet centrifugal tower I may introduce a scrubbing liquid, preferably gas oil, through line 32 and distributor 33 which may be a simple perforated pipe but which is preferably a column provided with tangentially disposed nozzles or atomizers 34 for injecting the liquid into the gas stream in such a direction as to increase the swirling motion. The amount of scrubbing liquid introduced should be such as to effect partial condensation of the heaviest reaction products in order to form a fog or mist which weights the catalyst particles and permits them to be drawn to the separator walls so that catalyst-free gases and vapors are taken overhead through line 35 and a wet catalyst slurry is withdrawn through funnel shaped baffle 30a to the lower part of the separator tower.

To prevent pasty solids from adhering to the walls of separator 30, I provide scrubbing means, preferably in the form of an annular pipe ring 33' having perforations directed against the inner walls of tank 30. Scrubbing liquid may be introduced into pipe ring 33' through line 32'. Any number of annular scrubbers of this type may be employed or any equivalent means used to insure the removal of solids thrown out of the vapor stream in separator 30.

The gases and vapors from line 35 enter fractionating tower 36 which is provided with a suitable reboiler 37 and a cycle oil draw-off line 38. Normally gaseous hydrocarbons may be taken overhead through line 39 and cooler 40 to receiver 41 from which gases are vented through line 42. A part of the liquids from this separator which may be chiefly propane or butane or a mixture thereof may be withdrawn from the system through line 43 and another part of these liquids may be recycled by pump 44 and line 45 for reflux in the top of tower 36. Gasoline may be withdrawn as a side stream through line 47. A clean gas oil may likewise be withdrawn as a side stream through line 48 to scrubbing liquid storage tank 49 (any excess being withdrawn through line 49a) from which it is pumped through line 50 by pump 51 through cooler 52 either through line 31 or line 32 for the purpose hereinabove described. It should be understood that this description of the fractionation system is diagrammatic and that in actual practice the system would probably involve more equipment. For instance, end point gasoline would be taken overhead from tower 36 and stabilized in a subsequent column.

The concentrated catalyst slurry from the hopper base 53 of tower 30 is forced by pump 54 to atomizer 55 in the top of drying tower 27. This atomized slurry passes downwardly in said drying tower counter-current to the upward flow of hot reaction products so that all of the gas oil is vaporized from the catalyst and so that dry powdered catalyst may be withdrawn from the base of drying tower 27 through line 56 to stripper 21. It will thus be seen that a part of the gas oil traverses the cycle from separator 30 to dryer 27 and thence back to separator 30 while another part of the gas oil traverses the cycle from separator 30 to fractionating column 36 to storage tank 49 and back to separator 30. Liquid gas oil from which most of the catalyst is separated out may be withdrawn from tower 30 through line 57 to liquid storage tank 49. It is not essential that this oil be absolutely free from powdered catalyst because it is to be recycled to the wet centrifugal separator either through lines 31 or 32.

Catalyst from line 23 comprising that recovered from the cyclone separators and that recovered from dryer 27 is introduced into regeneration conduit 58 into which regenerating gas including regulated amounts of oxygen is introduced through line 59. Additional amounts of air may be introduced at spaced points through lines 60 and 61. The regeneration is preferably effected at a temperature of about 900 to 1050° F. and the hot regeneration gases together with regenerated catalyst are then introduced into cyclone separator 62 which is provided with an upper cylindrical baffle 63 through which hot regeneration gases are withdrawn by means of line 64.

About 95 to 99.9% of the regenerated catalyst passes from the base of separator 62 to stripping tower 65 which is likewise provided with inclined baffles 66. A stripping gas such as steam, flue gas or other inert gas is introduced through line 67 and withdrawn through line 68 to line 64. The hot gases from line 64 are introduced through suitable distributing means 69 into the base of drying tower 70 and are thence conducted by line 71 to wet centrifugal separator 72. Water from line 73 may be introduced into the hot gases in line 71 in amounts sufficient to cool the gases to a temperature of about 212 to 210° F. or lower. Likewise water may be introduced through line 74 and distributor 75 into the lower part of the wet centrifugal separator. The distributing element 75 may be a simple perforated pipe or it may be a conduit provided with tangentially arranged nozzles 76. The gases are introduced through line 71 into separator 72 tangentially and at a sufficiently high velocity to effect the removal of the water droplets which form as a mist or fog in line 71 or which are atomized directly into the centrifugal separation zone from distributor 75 or nozzles 76. These very small water droplets wet the catalyst particles and increase their mass to such an extent that they are thrown to the walls of the separator by the centrifugal action of the swirling gases so that catalyst-free gases leave the top of the separator through line 77.

An aqueous catalyst slurry flows downwardly through funnel shaped baffle 72a into a settling zone at the base of separator 72. Concentrated slurry from the hopper shaped bottom 78 of separator 72 is withdrawn through line 79 by means of pump 80 and forced through line 81 to atomizer 82 in the top of drying tower 70. Water is completely vaporized from the atomized slurry before this slurry comes in contact with the walls of the dryer so that by the time the catalyst reaches the base of the drying tower it may be withdrawn as a powder through line 83 to stripper 65. Catalyst from stripper 65 and line 84 is returned through line 85 to powder catalyst hopper 15. If pneumatic conveying means are employed in return line 85, a centrifugal separator may be provided at the top of hopper 15 and the conveyor gases may be withdrawn through centrifugal baffle 87 and line 88.

Water from the settling zone in the base of separator 72 may be withdrawn through line 89 to tank 90 which may be supplied with additional water through line 91. This water is forced by pump 92 to cooler 93 either through line 73 or line 74 as hereinabove described. It is immaterial if complete separation is not effected in the base of tower 72 since any catalyst which remains in this water will simply be recycled and recovered in the next contacting step.

From the above description it will be seen that I have accomplished the objects of my invention. It should be understood, however, that I do not limit myself to the particular embodiment hereinabove described since the invention may be practiced in other processes and under other operating conditions and in a wide variety of apparatus. Wherever a single cyclone separator is shown, for example it is obvious that a plurality of such separators may be used. Any conventional scrubber may be used in place of the particular scrubber herein described, but this type of scrubber offers decided advantages over types heretofore used. Other modifications and equivalents will be apparent to those skilled in the art from the above description.

I claim:

1. The method of recovering powdered catalyst from a hot gaseous stream which comprises separating about 95 to 99.9% of the catalyst from said hot gases in a dry separation step, passing the hot gases from the dry separation step through a slurry drying zone, cooling said gases by the introduction of a vaporizable liquid in amounts to cause the formation of a mist which weights catalyst particles remaining in the gases, centrifugally separating said mist and weighted catalyst particles from the gas stream in the form of a slurry, introducing at least a part of said slurry to said drying zone, vaporizing liquid from catalyst particles in said drying zone and combining catalyst from said drying zone with catalyst separated in the dry separation step.

2. The method of claim 1 wherein the hot gases are hydrocarbon reaction gases and the liquid is gas oil.

3. The method of claim 1 wherein the hot gases are regeneration gases and the liquid is water.

4. The method of claim 1 which includes the further step of stripping the combined catalyst from said drying zone with the catalyst separated in the dry centrifugal separation step.

5. In a hydrocarbon conversion system wherein powdered catalyst must be separated from hot gases or vapors, the method of effecting catalyst separation which comprises passing the powdered catalyst and gases or vapors from a treating zone to a dry separation zone and separating most of the catalyst from vapors in said separation zone, passing separated catalyst from said separating zone to a stripping zone, passing vapors from said separating zone to a slurry drying zone and thence to a wet centrifugal separation zone, separating suspended catalyst particles from said vapors in said wet centrifugal separation zone in the form of a slurry, introducing said slurry into said drying zone and contacting said slurry with vapors from the dry separation zone for removing liquid from said slurry, introducing catalyst from said drying zone to said stripping zone and therein stripping catalyst from said dry separation step together with catalyst recovered from said wet centrifugal separation step.

6. A hydrocarbon conversion process which comprises reacting hydrocarbon vapors with a powdered catalyst under such conditions as to convert said hydrocarbons in the vapor phase into products including gasoline and gas oil, separating the bulk of the catalyst from the reaction products while said products remain in vapor phase, passing the vapors from the separation step through a catalyst slurry drying zone and thence to a wet catalyst separation zone, passing vapors from said separation zone to a fractionation zone, removing a gasoline fraction and a gas oil fraction from said fractionation zone, returning at least a part of said gas oil fraction to said wet separation zone and partially vaporizing said gas oil fraction to effect a cooling and partial condensation of vapors entering said wet separation zone, removing a catalyst slurry from the base of said wet separation zone and introducing it into said slurry drying zone for revaporizing the oil from said slurry, withdrawing substantially dry catalyst from said drying zone and admixing said catalyst with the bulk of the catalyst initially separated from reaction product vapors.

7. In a hydrocarbon conversion process employing powdered catalyst, producing products of the gasoline and gas oil boiling range and characterized by the steps of removing catalyst particles from a vapor stream first in a dry separation zone and then in a wet separation zone prior to the separation of a gas oil fraction from said products, the method of operation which comprises removing said vapor stream from said dry separation zone, passing said stream through a drying zone and then introducing said stream into said wet separation zone, removing dry catalyst from said dry separation zone, removing wet catalyst from said wet separation zone, passing said removed wet catalyst through said drying zone, removing dry catalyst from the base of said drying zone, and commingling the dry catalyst from the drying zone with the dry catalyst from the dry separation zone.

FRANK G. BRUECKMANN.